US009889562B1

United States Patent
Rembisz

(10) Patent No.: US 9,889,562 B1
(45) Date of Patent: Feb. 13, 2018

(54) SMART KICKSTAND FOR BALANCING A MOBILE ROBOTIC ARM

(71) Applicant: X Development LLC

(72) Inventor: Justine Rembisz, San Francisco, CA (US)

(73) Assignee: X Development LLC, Mountain View, CA (US)

(*) Notice: Subject to any disclaimer, the term of this patent is extended or adjusted under 35 U.S.C. 154(b) by 124 days.

(21) Appl. No.: 14/885,292

(22) Filed: Oct. 16, 2015

(51) Int. Cl.
*B25J 19/06* (2006.01)
*B25J 5/00* (2006.01)
*B25J 9/16* (2006.01)
*B25J 19/00* (2006.01)
*B25J 19/02* (2006.01)

(52) U.S. Cl.
CPC ........... *B25J 9/1638* (2013.01); *B25J 5/00* (2013.01); *B25J 19/0008* (2013.01); *B25J 19/021* (2013.01); *B25J 19/027* (2013.01); Y10S 901/01 (2013.01)

(58) Field of Classification Search
CPC ........ B25J 5/00; B25J 19/0008; B25J 19/021; B25J 19/027; B25J 9/1638; B25J 9/1607; B25J 9/1633; Y10S 901/01
See application file for complete search history.

(56) References Cited

U.S. PATENT DOCUMENTS

| 2,986,295 A * | 5/1961 | Shaffer | B66F 9/07559 280/755 |
| 6,062,600 A | 5/2000 | Kamen et al. | |
| 7,847,504 B2 | 12/2010 | Hollis | |
| 2006/0097683 A1* | 5/2006 | Hosoda | B25J 5/007 318/568.12 |
| 2007/0017754 A1* | 1/2007 | Kakinuma | B62H 1/12 188/32 |
| 2008/0028883 A1 | 2/2008 | Inada et al. | |
| 2011/0071677 A1* | 3/2011 | Stilman | B25J 5/007 700/254 |
| 2014/0277847 A1 | 9/2014 | Cann et al. | |

FOREIGN PATENT DOCUMENTS

WO 2014/066422 5/2014

OTHER PUBLICATIONS

Hollis; "Planning in high-dimensional shape space for a single-wheeled balancing mobile robot with arms"; IEEE International Conference on Robotics and Automation (ICRA); 2012; pp. 130-135.*

* cited by examiner

*Primary Examiner* — Stephen Holwerda
(74) *Attorney, Agent, or Firm* — McDonnell Boehnen Hulbert & Berghoff LLP

(57) ABSTRACT

An example system includes a robotic arm coupled to a mobile base. The robotic arm includes a plurality of segments coupled via at least one joint, which includes at least one joint angle sensor. The system also includes a controller configured to carry out operations including receiving, from the at least one joint angle sensor, information indicative of a pose of the robotic arm. The operations include, based on the information indicative of the pose of the robotic arm, determining that a torque induced by the robotic arm is above a predetermined torque threshold. The operations also include causing an adjustable support member to extend out of the mobile base in an orientation that counteracts the torque.

22 Claims, 7 Drawing Sheets

SMART KICKSTAND FOR BALANCING A MOBILE ROBOTIC ARM

BACKGROUND

Robotic arms may enable a variety of remote and/or automated lifting, gripping, and manipulation tasks in diverse applications such as manufacturing, inventory management, and household helper robots. In some cases, robotic arms may lift payloads with certain static or dynamic arm poses such that the robot may become unbalanced and/or tip over.

SUMMARY

Implementations in the present disclosure relate to systems having one or more robotic arms coupled to a mobile base. Specifically, the systems may include an adjustable support member configured to provide support for the mobile base and the system as a whole. In an example implementation, a controller may cause the adjustable support member to extend from the mobile base in response to receiving information indicative of a tipping condition or another instability condition of the system. For instance, the controller may adjust a position of the adjustable support member based on a pose of the one or more robotic arms. The adjustable support member may provide a physical support or counterweight so as to remove the instability condition. Alternatively or additionally, the controller may adjust the adjustable support member based on a torque about the mobile base.

An example implementation includes a mobile base and a robotic arm. The robotic arm is coupled to the mobile base and includes a plurality of arm segments coupled via at least one joint. The at least one joint includes at least one joint angle sensor. The implementation includes an adjustable support member coupled to the mobile base. The implementation also includes a controller having a memory and a processor. The memory stores instructions that are executable by the processor to cause the controller to perform operations. The operations include receiving, from the at least one joint angle sensor, information indicative of an angle of the at least one joint. The operations also include, based on the information indicative of the angle of the at least one joint, determining that a torque induced, at least in part, by the robotic arm is above a predetermined torque threshold. The torque includes a moment of force about the mobile base. The operations yet further include causing the adjustable support member to extend out of the mobile base in an orientation that counteracts the torque.

Another implementation includes receiving, from at least one joint angle sensor, information indicative of an angle of at least one joint. The at least one joint is coupled to at least one arm segment of a robotic arm. The robotic arm includes a plurality of arm segments. The robotic arm is coupled to a mobile base. The implementation also includes, based on the information indicative of the angle of the at least one joint, determining that a torque induced, at least in part, by the robotic arm is above a predetermined torque threshold. The torque includes a moment of force about the mobile base. The implementation also includes causing an adjustable support member to extend out of the mobile base in an orientation that counteracts the torque.

Other aspects, features, and implementations will become apparent to those of ordinary skill in the art by reading the following detailed description, with reference where appropriate to the accompanying drawings.

DETAILED DESCRIPTION

I. Overview

Figure 1A:
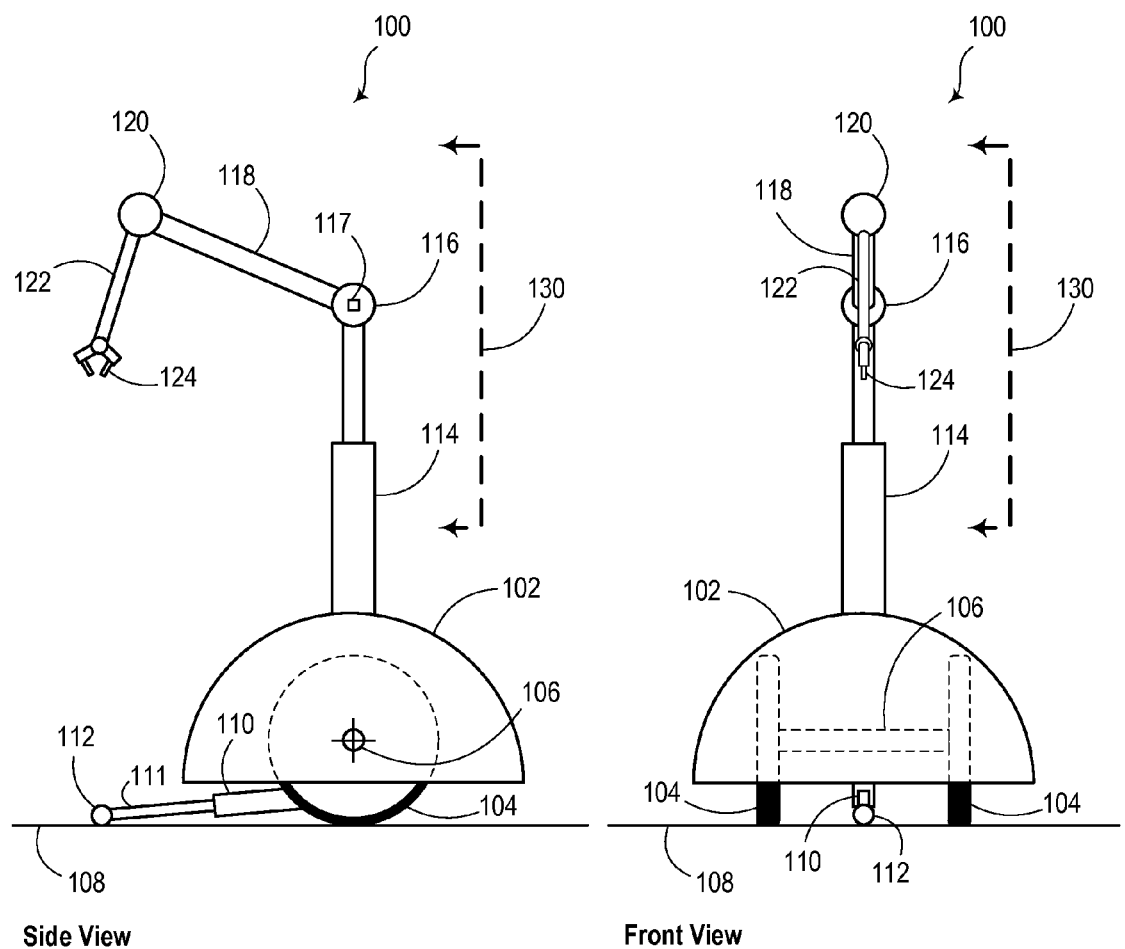
FIG. 1A illustrates a robotic system, according to an example implementation.

Implementations described herein may relate to a robotic arm attached to a mobile base and a "smart kickstand" that may be deployed from the mobile base to improve stability. Such systems may deploy the smart kickstand to prevent the robotic arm and mobile base from tipping over due to: a) a static or dynamic pose of the robotic arm and base; and/or b) a payload carried by the robotic arm or base.

In an example implementation, a robotic system may include a robotic arm and a mobile base. A controller associated with the robotic system may determine a pose of the robotic arm. The pose of the robotic arm may be determined in various ways. For example, the robotic arm may include one or more arm sections that may be moveable with respect to one another via joints. Each joint may include one or more joint angle sensors. The joint angle sensor may include a magnetic or optical encoder. In such a scenario, the controller may receive, from the one or more joint angle sensors, information indicative of the pose of the robotic arm.

Furthermore, the controller may determine a kinematic model based on the pose of the robotic arm. The kinematic model may include an angle of each arm section of the robotic arm, a velocity and/or an acceleration of each arm section of the robotic arm, and an induced torque on the mobile base. Other information (e.g., the mass and acceleration of the payload) may be included in the kinematic model.

The controller may determine, based on the kinematic model, whether the robotic system should have additional stability support. For example, additional stability support may be observable if an induced torque on the mobile base exceeds a predetermined threshold. That is, if the torque on the mobile base is determined to be sufficient to cause the robotic system to tip over, additional stability support may be desirable. The desirability of stability support may be determined for other reasons. For instance, if the robotic system is in motion (e.g., via wheels on the mobile base), the controller may predict or anticipate whether stability support should be provided when the robotic system stops, accelerates, or slows down.

In response to determining to provide additional stability support, the controller may cause one or more adjustable support members to provide the additional stability support. For example, the one or more adjustable support members may be configured to extend from a lower portion of a mobile base of the robotic system so as to contact a supporting surface (e.g., the ground). In an example implementation, the adjustable support member may include two or more telescoping portions, one or more rotational portions, and an end portion. The end portion may include an omni-wheel, a foot, a vacuum, or one or more suction cups.

The adjustable support member may be operable to be deployed at various rotational angles with respect to the mobile base of the robotic system. For example, the adjustable support member may be extended from the mobile base along a rotational angle that corresponds with a rotational angle of the robotic arm. The adjustable support member may be operable to dynamically extend/retract and rotate with respect to the mobile base in response to the kinematic model and the need for additional stability support.

In some implementations, a plurality of adjustable support members is possible. Furthermore, in some implementations, the controller may determine the kinematic model and/or whether additional stability support is needed further based on information received from an inertial measurement unit associated with the robotic system. Optionally, the robotic system may include a camera and/or other sensors so as to ensure the area around the robotic system is clear so as to safely deploy the adjustable support member.

II. Example Systems

Figure 1B:
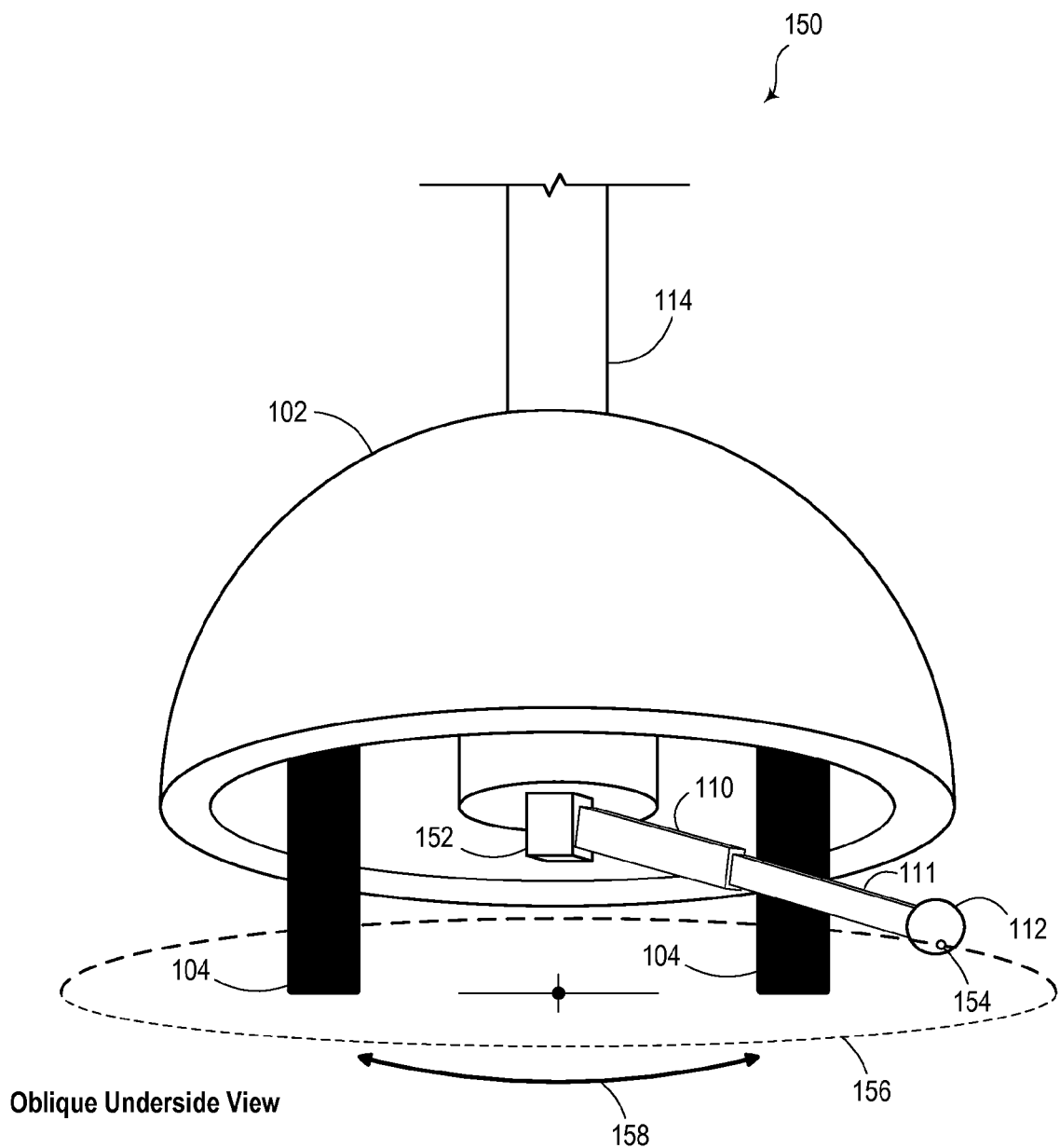
FIG. 1B illustrates a robotic system, according to an example implementation.
Figure 1C:
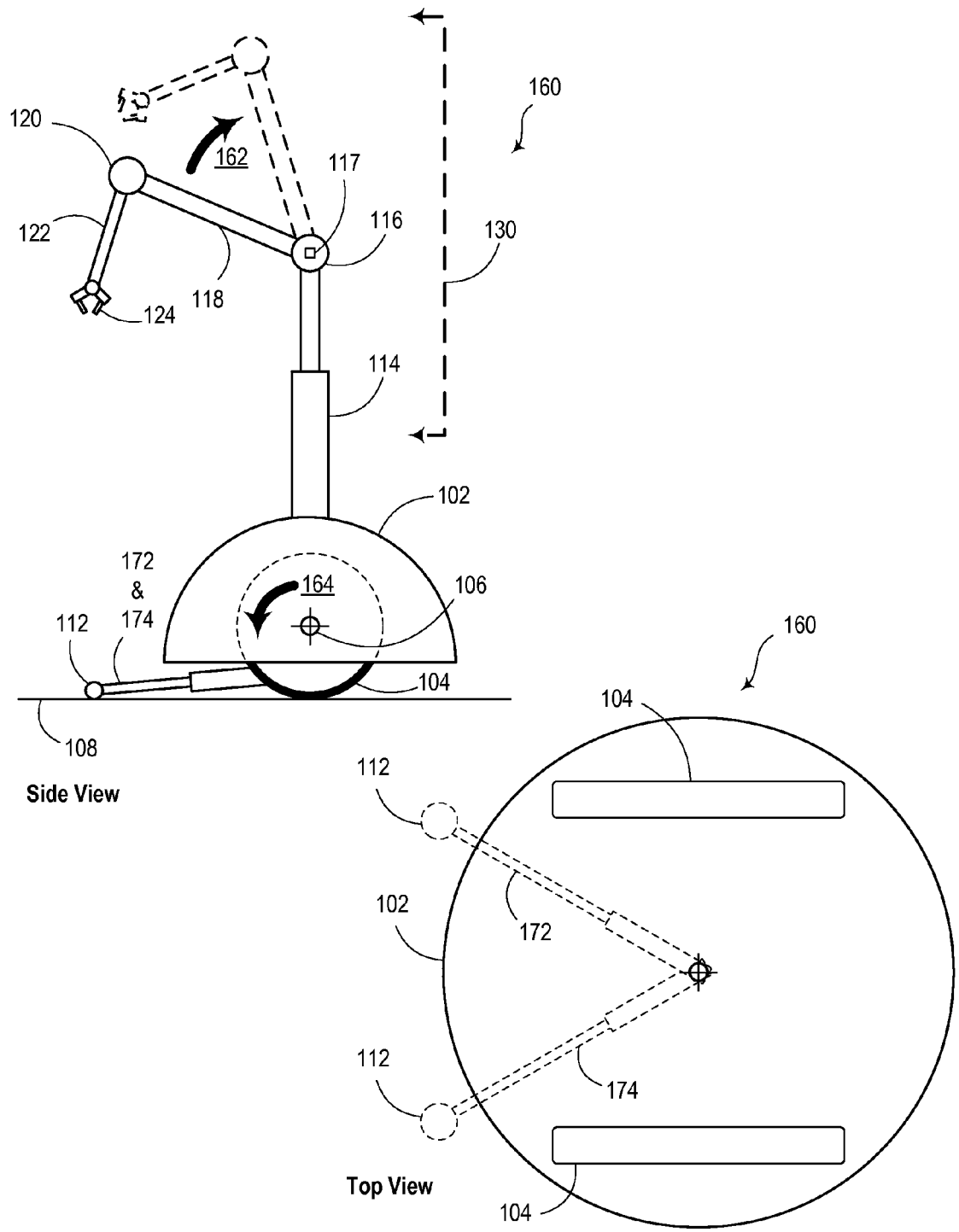
FIG. 1C illustrates a robotic system, according to an example implementation.

FIGS. 1A-1C illustrate robotic systems, according to example implementations. FIG. 1A illustrates side and front views of a robotic system 100, according to an example implementation. Robotic system 100 includes a mobile base 102, which is coupled to at least one robotic arm 130. The mobile base 102 may include one or more wheels 104 configured to roll on a supporting surface 108. One or more motors may cause the wheels 104 to rotate about an axle 106 so as to provide locomotion for the mobile base 102 and the robotic system 100 in general.

The robotic arm 130 may include a plurality of arm segments 114, 118, and 122. The arm segments may have adjustable lengths, such as arm segment 114, which may include a hydraulic or pneumatic piston, a screw drive, or another type of adjustable length member. Other arm segments may have a fixed length (e.g., arm segments 118 and 122). The plurality of arm segments may be coupled via joints 116 and 120. The robotic arm 130 may include an end unit such as a gripper 124. For example, gripper 124 may be coupled to arm segment 122.

The robotic arm 130 may include a variety of actuators (not illustrated) configured to provide movement to the elements of the robotic arm 130. Actuators may include one or more types of motors that may provide rotational and/or linear motion. The actuators may operate via hydraulic, pneumatic, electric, thermal, magnetic, or mechanical methods, or any combination of such methods. For example, each of the joints 116 and 120 may include rotational actuators controlled via an electric motor, which may be configured to rotate about an axis.

Many other possible configurations include a robotic arm attached to a mobile base. For example, multiple robotic arms could be attached to a single base. Furthermore, implementations including multiple mobile bases are contemplated. Also, the robotic arm 130 may include more or fewer arm segments and/or joints. The robotic arm 130 may be configured to carry out various tasks. Accordingly, the robotic arm 130 may include end units other than a gripper.

The robotic system 100 may include various sensors configured to provide information indicative of a position, a force or a torque. Such sensors may be located at, or proximate to, the joints 116 and 120, on the arm segments 114, 118, and 122, or located elsewhere. In an example implementation, joint 116 may include a joint angle sensor 117. In an example embodiment, the sensors may be separately packaged and coupled to the joints 116 and 120, the arm segments 114, 118, and 122 to measure characteristics of those elements of the robotic system. Additionally or alternatively, the sensors may be integrated directly into the actuators. That is, sensors contemplated herein may include control sensors incorporated into various elements of the robotic system 100.

In an example implementation, an adjustable support member 110 is coupled to the mobile base 102. The adjustable support member 110 may include an end portion 112. The end portion 112 may be configured to physically contact the supporting surface 108 (e.g., the ground) so as to counteract a torque on the mobile base 102.

The adjustable support member 110 may be extendible from the mobile base 102. That is, the adjustable support member 110 may include a length-adjustable portion 111. The length-adjustable portion 111 may include a hydraulic or pneumatic piston, a screw drive, or another type of length-adjustable member. In an example implementation, the length-adjustable portion 111 may be extended at least 0.5 meters beyond an outer extent of the mobile base 102. However, the length-adjustable portion 111 may be configured to extend to different lengths, which may scale with the overall size (e.g., height) and/or weight of the robotic system 100. In some embodiments, the size of the adjustable support member 110 may scale with the size and/or weight of the robotic system 100. For example, a cross-sectional area and/or length of the adjustable support member 110 may be proportionally adjusted with respect to a size and/or weight of the other elements of the robotic system 100 to provide sufficient structural strength and/or mass.

While FIG. 1A illustrates the adjustable support member 110 as being coupled to an underside of the mobile base 102, other coupling locations are contemplated. For example, the adjustable support member 110 may be coupled to another surface of the mobile base 102.

The adjustable support member 102 may include one or more of a variety of materials. For example, the adjustable support member 102 may include any combination of steel, aluminum, titanium, plastic, and/or carbon fiber. Other materials are possible.

The robotic system 100 also includes a controller (not illustrated). The controller could be controller 430 as illustrated and described with respect to FIG. 4. The controller includes a memory 440 configured to store instructions. The controller includes a processor 432 configured to execute the instructions so as to carry out various operations, as described elsewhere herein. The controller may, but need not, be incorporated into the mobile base 102. For example, the controller may be located elsewhere as a mobile device such as a smartphone, laptop, tablet, or another type of computing device. In other implementations, the controller may be incorporated, at least in part, into a cloud computing platform or another type of distributed computing system.

FIG. 1B illustrates a robotic system 150, according to an example implementation. Robotic system 150 may be similar or identical to robotic system 100 as illustrated and described in FIG. 1A. FIG. 1B is an illustrative oblique underside view of the robotic system 150. Specifically, FIG. 1B illustrates an underside of the mobile base 102. Mobile base 102 is in contact with supporting surface 108, which is not illustrated for clarity. As shown, the adjustable support member 110 may be rotatably-adjustable with respect to a vertical axis of the robotic system 150. Namely, the adjustable support member 110 may incorporate, or may be coupled to, a rotatable member 152. The rotatable member 152 may be coupled to a motor, such as a stepper motor or another type of rotational actuator. In such a scenario, the adjustable support member 110 may be positioned within a range of angles 158 with respect to a central vertical axis of the mobile base 102. Specifically, the end portion 112 may be configured to contact the supporting surface 108 along at least a subset of locations 154 within a circular region 156 along the supporting surface 108 and centered about the mobile base 102. Some locations within the circular region 156 may not be accessible due to obstructions such as wheels.

FIG. 1C illustrates a robotic system 160, according to an example implementation. The robotic system 160 may be similar or identical to robotic systems 100 and 150 as illustrated and described in relation to FIGS. 1A and 1B, respectively. As illustrated in the side view of robotic system 160, the robotic arm 130 may conduct a movement. Namely, joint 116 may rotate clockwise such that arm segments 118 and 122 rotate upwards. Joint angle sensor 117 may provide information to the controller related to the angle of joint 116. Namely, the joint angle sensor 117 may provide periodic or continuous information (e.g., a digital or analog voltage signal) to the controller that may be indicative of a rotational movement 162. The joint angle sensor 117 may be a magnetic encoder or an optical encoder. However, other types of angle sensors are contemplated.

The controller may be configured to determine that the rotational movement 162 by the robotic arm 130 may induce a torque. The induced torque may include a moment of force about the mobile base 102. For example, in the scenario illustrated in FIG. 1C, the induced torque may include a counter-clockwise torque about the mobile base 102 (e.g., induced torque 164). In such a scenario, the controller may compare the induced torque 164 to one or more predetermined torque threshold values. In particular, the predetermined torque threshold values may include values that could cause balance instability (e.g., a tip-over condition). Other types of balance instability are possible. For example, the predetermined torque threshold values may be configured to prevent oscillatory instability (shaking) and/or overspeed conditions.

In an example implementation, the controller may use a three-dimensional whole body kinematic model of the robotic system 160 to determine whether the induced torque 164 will surpass the one or more predetermined torque threshold values. The kinematic model may include mathematical functions that describe the relationship between the robotic system 160 and various movements of its components. Namely, the kinematic model may include rigid transformations that may describe the movement of components of the robotic system 160. The controller may be operable to carry out a variety of analyses of the kinematic model relating to stability and balance of the robotic system 160.

In scenarios where the induced torque may rise above a predetermined torque threshold, the controller is operable to cause at least one adjustable support member to extend from the mobile base 102. As illustrated in FIG. 1C, the controller may cause two adjustable support members 172 and 174 to extend from the mobile base 102 so as to provide physical support with the supporting surface 108 via the respective end portions 112. Furthermore, the controller may cause the adjustable support members 172 and 174 to extend from the mobile base 102 in an orientation that counteracts the torque.

In an example implementation, the controller may cause the adjustable support members 172 and 174 to reduce the sum of torques on the mobile base 102 below the predetermined torque threshold. That is, by providing physical contact with the supporting surface 108, the adjustable support members 172 and 174 may counteract the induced torque 164, at least in part. In other implementations, the adjustable support member 172 and 174 need not physically contact the supporting surface 108. That is, the adjustable support members 172 and 174 may be configured to counteract the induced torque 164, at least in part, by providing a counterbalance about the mobile base 102.

Figure 2:
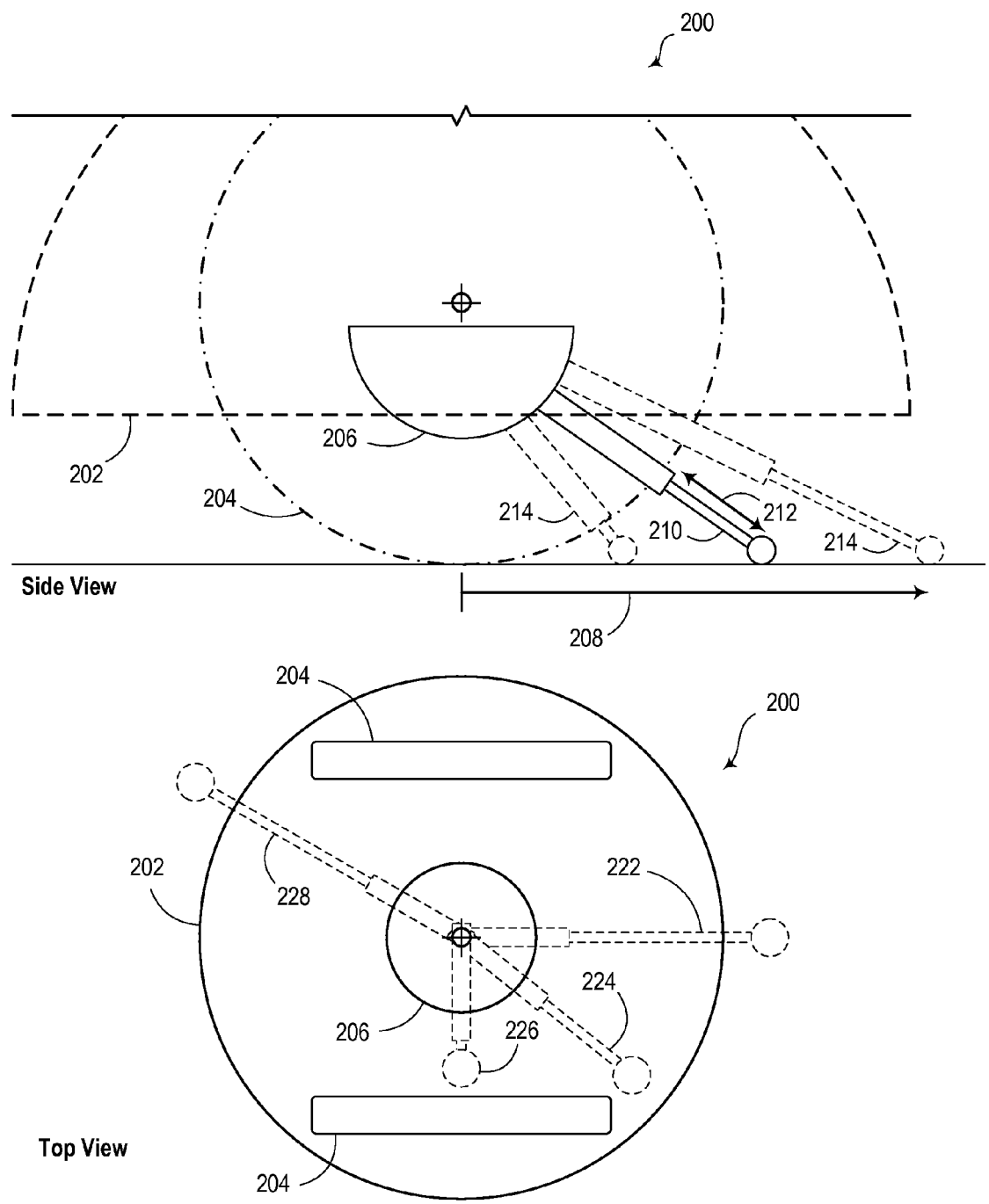
FIG. 2 illustrates a robotic system, according to an example implementation.

FIG. 2 illustrates side and top views of a robotic system 200, according to an example implementation. The robotic system 200 may be similar or identical to robotic systems 100, 150, 160 as illustrated and described in reference to FIGS. 1A, 1B, and 1C. The robotic system 200 includes a mobile base 202 that includes two wheels 204. The robotic system 200 may also include a rotatable coupling 206. The rotatable coupling 206 may be operable to position the adjustable support member towards various locations.

As illustrated in FIG. 2, the adjustable support member(s) may be positioned at various distances 208 away from a central axis of the mobile base 202. The central axis may be perpendicular to the supporting surface and may extend through a center of mass of the robotic system or a center of the mobile base 202. For example, the adjustable support member 214 may be positioned to contact the supporting surface less than a wheel radius away from the central axis of the mobile base 202. Additionally or alternatively, adjustable support member 210 may be configured to extend via extendible length portion 212 to contact the supporting surface at a distance greater than a wheel diameter away from the mobile base 202. In some scenarios, an adjustable support member may be configured to extend beyond an extent (e.g., a radius) of the mobile base 202, as shown by adjustable support member 214.

FIG. 2 also illustrates a top view of the robotic system 200 showing various angular positions for adjustable support members. For example, the rotatable coupling 206 may be operable to position the adjustable support member at various angles with respect to a central axis of the mobile base 202. For example, adjustable support members 222, 224, 226, and 228 may illustrate various positions possible for one or more adjustable support members. Specifically, the adjustable support member may be rotatable within 360° with respect to the central axis of the mobile base 202. At some angles, the adjustable support member (e.g., adjustable support member 226) may need to retract to a shorter length so as to avoid obstructions, such as the wheels 204. At other angles, the adjustable support member (e.g., adjustable support member 228) may be operable to extend to its full length, depending on the circumstances. In some implementations, movements of the robotic arm may be planned in advance based on the possible range(s) of motion of the adjustable support member(s).

Figure 3:
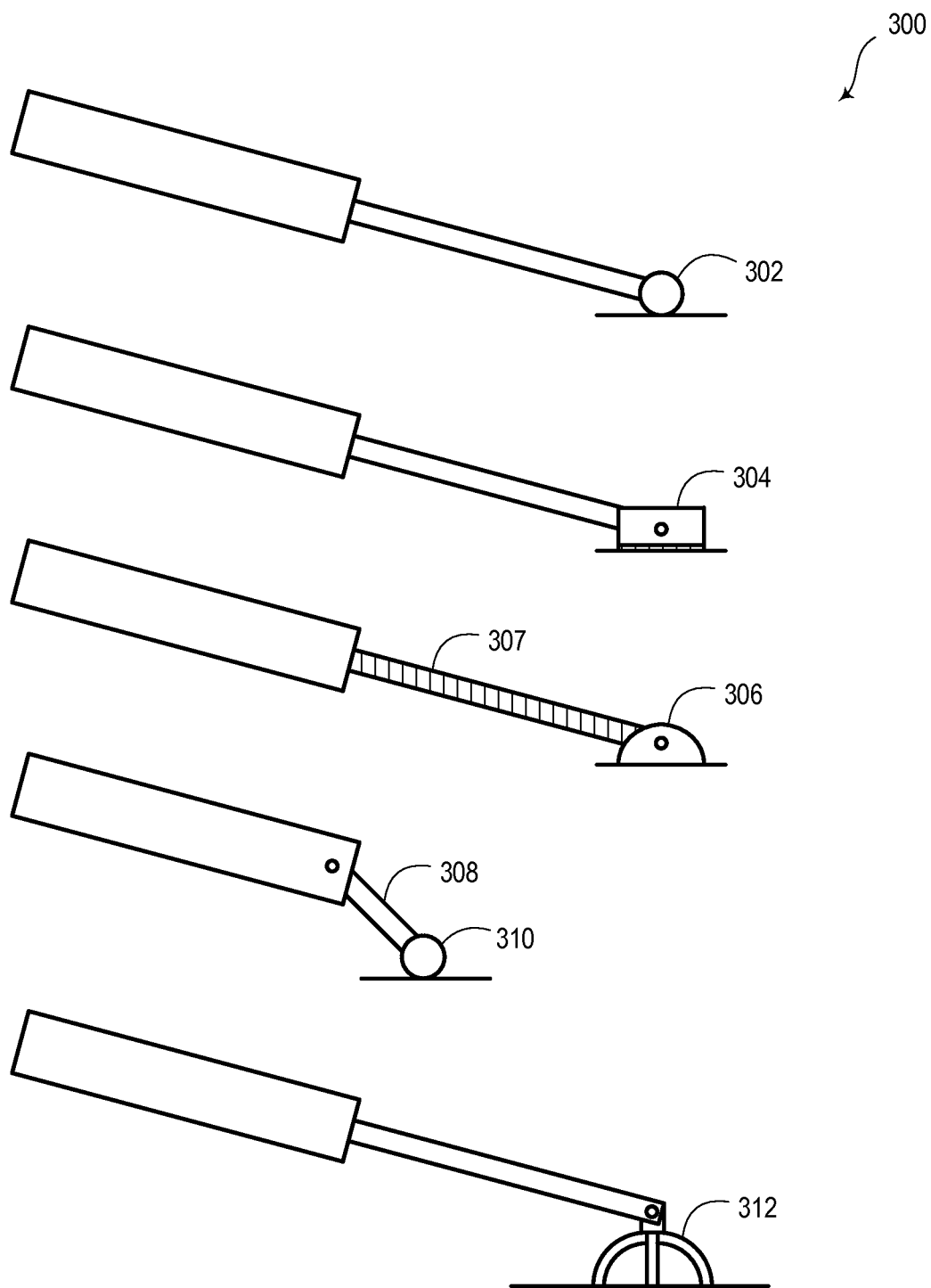
FIG. 3 illustrates several adjustable support members, according to example implementations.

FIG. 3 illustrates several adjustable support members 302, 304, 306, 310, and 312, according to example implementations 300. The various adjustable support members may include various components. For instance, the adjustable support members 302, 304, 306, 310, and 312 may include one or more telescoping portions 307, one or more rotational portions, and an end portion. For instance, adjustable support member 302 may include an end portion that is an omni-wheel or rotating ball. Alternatively, adjustable support member 304 may include an end portion that is a foot.

Adjustable support member 306 may include an end portion configured to be operable as a suction cup. Furthermore, a telescoping portion of adjustable support member 306 may include a rotatably extendible portion (e.g., a jack screw extension) operable to mechanically adjust a length of the adjustable support member 306. Other types of telescoping portions are possible.

Adjustable support member 310 may include a jointed arm portion 308, which may be operable to adjust an angle of the adjustable support member 310 based, for example, on a torque needed to counteract the torque induced by the movement of the robotic arm. In some implementations, adjustable support members may include a plurality of end portions or "fingers", as illustrated with adjustable support member 312.

Other end portions are contemplated. For example, an adjustable support member may include a mass configured to help counterbalance the robotic system.

Figure 4:
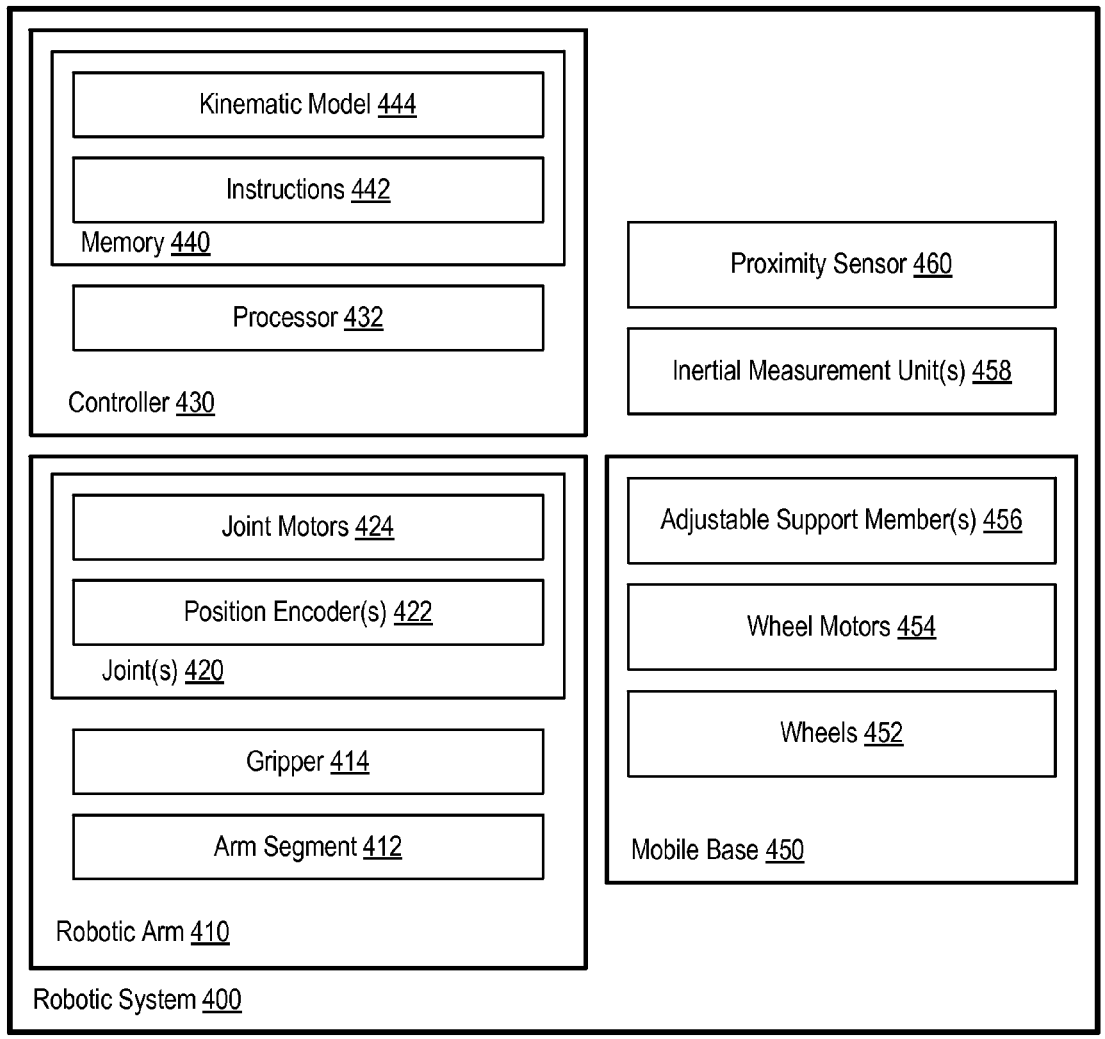
FIG. 4 is a schematic block diagram illustrating a robotic system, according to an example implementation.

FIG. 4 is a schematic block diagram illustrating a robotic system 400, according to an example implementation. Some or all elements of the robotic system 400 may be similar or identical to corresponding elements in robotic system 100, 150, 160, and 200, as illustrated and described with respect to FIGS. 1A, 1B, 1C, and 2. Robotic system 400 may include a robotic arm 410, a controller 430, and a mobile base 450.

The robotic arm 410 may include various joints 420, arm segments 412, and, in some implementations, one or more grippers 414. The joints 420 may include one or more joint motors 424 and position encoder 422 or another type of joint angle sensor.

The controller 430 may include a processor 432 and a memory 440. The memory 440 may include a memory storage device containing at least a kinematic model 444 and program instructions 442.

The mobile base 450 includes one or more wheels 452 and wheel motors 454 configured to drive the wheels 452. The mobile base 450 also includes one or more adjustable support members 456. The robotic system 400 may optionally include one or more inertial measurement units (IMUs) 458. The IMUs 458 may be operable to provide information to the controller 430 indicative of a position and a velocity of the robotic system 400. For example, multiple IMUs may be mounted to the arm segments 412 to determine a kinematic position, or pose, of the robotic arm 410.

The controller 430 may be configured to carry out various operations as described herein. For example, the controller 430 may be operable to determine that the torque induced, at least in part, by the robotic arm 410 is above a predetermined torque threshold. In some implementations, such a determination may be based on information about an angle of each arm segment with respect to at least one other arm segment of the plurality of arm segments 412. Additionally or alternatively, the determination may be based on a velocity of each arm segment of the plurality of arm segments 412. Yet further, the determination may be alternatively or additionally based on an acceleration of each arm segment of the plurality of arm segments 412. Other ways to determine that an induced torque is above a predetermined torque threshold are contemplated herein.

For instance, the robotic arm may be carrying a payload. In such a scenario, the controller 430 may determine that the torque is above the predetermined torque threshold based at least on the payload of the robotic arm 410.

The controller 430 may be further operable to continuously or intermittently adjust the adjustable support member(s) 456 based on a change of the torque induced about the mobile base 450. That is, the controller 430 may be continuously causing the adjustable support member 456 to move so as to counteract the torque induced by a movement of the robotic arm and/or movement of the mobile base 450.

In some implementations, the controller 430 may receive information from the IMU 458. In such scenarios, the controller 430 may determine whether the induced torque is above the predetermined torque threshold by further taking into account the IMU information (as well as the joint angle information).

Alternatively, the robotic system 400 may receive information about an induced torque from sensors other than position encoder 422. For example, the one or more IMUs 458 may be configured to detect a position and a velocity of at least one of the mobile base 450 or the robotic arm 410. That is, the IMUs 458 may be configured to determine a pose of the robotic arm 410 and/or the mobile base 450. The controller 430 may be configured to receive, from the IMUs 458, information indicative of the position and the velocity of at least the mobile base 450 or the robotic arm 410. Based on the received IMU information, the controller 430 may determine that an induced torque is above the predetermined torque threshold. In such a scenario, the controller 430 may cause the adjustable support member to extend out of the mobile base 450 so as to counteract the torque.

In example implementations, the robotic system 400 may include a proximity sensor 460. The proximity sensor may be one or more of: an ultrasonic proximity sensor, a camera, a LIDAR, or an infrared sensor. Other types of proximity sensors are contemplated. In such scenarios, the proximity sensor 460 may provide information to the controller 430 indicative of an area around the system. Particularly, the information may include obstacle data. As such, the controller 430 may also take into account obstacles present in a local environment around the mobile base 450 when positioning the adjustable support member 456.

III. Example Methods

Figure 5:
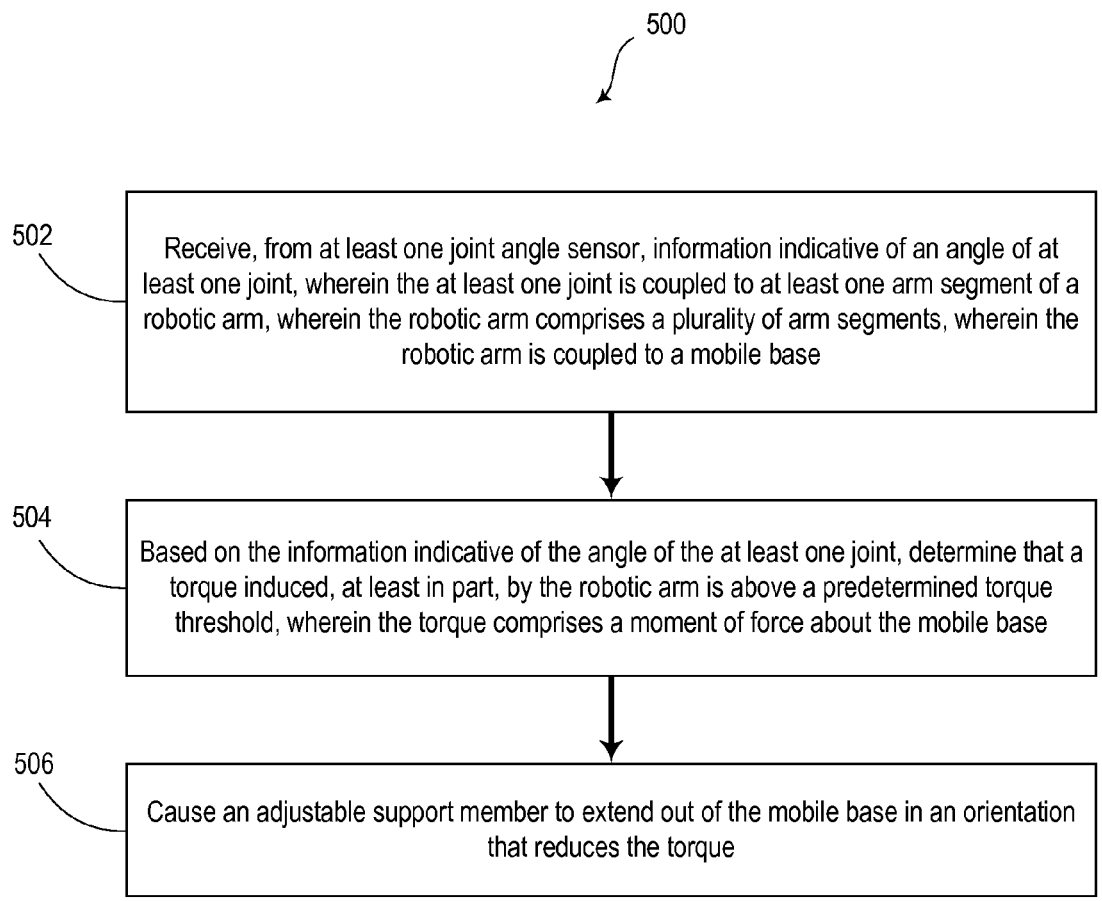
FIG. 5 illustrates a method, according to an example implementation.

FIG. 5 illustrates a method 500, according to an example implementation. The method 500 may include various blocks or steps. The blocks or steps may be carried out individually or in combination. The blocks or steps may be carried out in any order and/or in series or in parallel. Further, blocks or steps may be omitted or added to method 500.

The blocks of method 500 may be carried out by various elements of the robotic systems 100, 150, 160, 200, and 400 as illustrated and described in reference to FIGS. 1A, 1B, 1C, 2, and 4.

Block 502 includes receiving, from at least one joint angle sensor, information indicative of an angle of at least one joint. The at least one joint is coupled to at least one arm segment of a robotic arm. The robotic arm includes a plurality of arm segments. The robotic arm is coupled to a mobile base.

Block 504 includes, based on the information indicative of the angle of the at least one joint, determining that a torque induced, at least in part, by the robotic arm is above a predetermined torque threshold. In such a scenario, the torque includes a moment of force about the mobile base.

In an example implementation, determining that the torque induced, at least in part, by the robotic arm is above the predetermined torque threshold may include determining an angle of each arm segment with respect to at least one other arm segment of the plurality of arm segments. Additionally or alternatively, the determination may be made based on a velocity of each arm segment of the plurality of arm segments or an acceleration of each arm segment of the plurality of arm segments.

Yet further, the determination whether the induced torque is above a predetermined torque threshold may be based on determining a payload of the robotic arm. For example, the mass or content of the payload may be considered in determining whether the induced torque is above the predetermined torque threshold.

In another implementation, the determination may be based on information received from an inertial measurement unit (IMU). Specifically, the IMU may provide information indicative of a position and a velocity of the robotic arm or the mobile base.

Block 506 includes causing an adjustable support member to extend out of the mobile base in an orientation that counteracts the torque. In some implementations, the sum of torques about the mobile base may be reduced below the predetermined torque threshold.

Optionally, the method may include continuously or intermittently adjusting the adjustable support member based on a change of the torque. That is, the adjustable support member may be continually adjusted based on movements of the robotic arm and/or movements of the mobile base.

In some implementations, the method may include receiving, from a proximity sensor, information indicative of an area around the mobile base. In such scenarios, causing the adjustable support member to extend out of the mobile base may be based, at least in part, on the information from the proximity sensor. That is, the proximity sensor may provide obstacle or barrier information. As such, the adjustable support member may be positioned so as to avoid such obstacles or barriers.

The particular arrangements shown in the Figures should not be viewed as limiting. It should be understood that other implementations may include more or less of each element shown in a given Figure. Further, some of the illustrated elements may be combined or omitted. Yet further, an illustrative implementation may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and implementations have been disclosed, other examples and implementations will be apparent to those skilled in the art. The various disclosed examples and implementations are for purposes of illustration and are not intended to be limiting, with the true scope and spirit being indicated by the following claims.

What is claimed is:

1. A system comprising:
   a mobile base;
   a robotic arm coupled to the mobile base, wherein the robotic arm comprises a plurality of arm segments coupled via at least one joint, wherein the at least one joint comprises at least one joint angle sensor;
   an adjustable support member coupled to the mobile base, wherein the adjustable support member is configured to be deployed at various angles within a range of rotational angles about a vertical axis, wherein the vertical axis passes through the mobile base; and
   a controller comprising a memory and a processor, wherein the memory stores instructions that are executable by the processor to cause the controller to perform operations comprising:
   receiving, from the at least one joint angle sensor, information indicative of an angle of the at least one joint;
   based on the information indicative of the angle of the at least one joint, determining that a torque induced, at least in part, by the robotic arm is above a predetermined torque threshold, wherein the torque comprises a moment of force about the mobile base, wherein the predetermined torque threshold is based on a balance instability condition of the system; and
   causing the adjustable support member to extend out of the mobile base to a deployed position at one of the various angles, within the range of rotational angles, that counteracts the torque.

2. The system of claim 1 wherein the at least one joint angle sensor comprises at least one of: a magnetic encoder or an optical encoder.

3. The system of claim 1, wherein determining that the torque induced, at least in part, by the robotic arm is above the predetermined torque threshold comprises determining at least one of: an angle of each arm segment with respect to at least one other arm segment of the plurality of arm segments, a velocity of each arm segment of the plurality of arm segments, or an acceleration of each arm segment of the plurality of arm segments.

4. The system of claim 1, wherein determining that the torque is above the predetermined torque threshold comprises determining a payload of the robotic arm.

5. The system of claim 1, wherein the adjustable support member is configured to extend from the mobile base so as to perform at least one of:
   counterbalance the torque; or
   contact a supporting surface.

6. The system of claim 1, wherein the adjustable support member comprises a plurality of telescoping portions and an end portion.

7. The system of claim 6, wherein the end portion comprises at least one of: an omni-wheel, a foot, a wheel, a vacuum, a mass, or a suction cup.

8. The system of claim 1, wherein the operations further comprise adjusting the adjustable support member based on a change of the torque.

9. The system of claim 1, wherein the adjustable support member is one of a plurality of adjustable support members of the system.

10. The system of claim 9, wherein the plurality of adjustable support members comprise a plurality of rotating portions configured to extend from the mobile base.

11. The system of claim 1, further comprising at least one inertial measurement unit (IMU), wherein the operations further comprise receiving, from the at least one IMU, information indicative of a position and a velocity of the system, and wherein determining that the torque is above the predetermined torque threshold is further based on information received from the at least one IMU.

12. The system of claim 1, further comprising a proximity sensor, wherein the operations further comprise receiving, from the proximity sensor, information indicative of an obstacle in an area around the system, and wherein causing adjustable support member to extend out of the mobile base is based, at least in part, on avoidance of the obstacle detected by the proximity sensor.

13. The system of claim 1, wherein the balance instability condition comprises at least one of: a tip-over condition, an oscillatory instability condition, or an overspeed condition.

14. The system of claim 1 wherein the operations further comprise planning movements of the robotic arm based on a range of motion of the adjustable support member.

15. A method comprising:
receiving, from at least one joint angle sensor, information indicative of an angle of at least one joint, wherein the at least one joint is coupled to at least one arm segment of a robotic arm, wherein the robotic arm comprises a plurality of arm segments, wherein the robotic arm is coupled to a mobile base;
based on the information indicative of the angle of the at least one joint, determining that a torque induced, at least in part, by the robotic arm is above a predetermined torque threshold, wherein the torque comprises a moment of force about the mobile base, wherein the predetermined torque threshold is based on a balance instability condition of at least the mobile base; and
causing an adjustable support member, which is configured to be deployed at various angles within a range of rotational angles about a vertical axis, to extend out of the mobile base to a deployed position at one of the various angles, within the range of rotational angles, that counteracts the torque.

16. The method of claim 15, wherein determining that the torque induced, at least in part, by the robotic arm is above the predetermined torque threshold comprises determining at least one of: an angle of each arm segment with respect to at least one other arm segment of the plurality of arm segments, a velocity of each arm segment of plurality of arm segments, or an acceleration of each arm segment of the plurality of arm segments.

17. The method of claim 15, wherein determining that the torque is above the predetermined torque threshold comprises determining a payload of the robotic arm.

18. The method of claim 15, further comprising adjusting the adjustable support member based on a change of the torque.

19. The method of claim 15, further comprising receiving, from an inertial measurement unit (IMU), information indicative of a position and a velocity of the robotic arm or the mobile base, and wherein determining that the torque is above the predetermined torque threshold is further based on information received from the IMU.

20. The method of claim 15, further comprising receiving, from a proximity sensor, information indicative of an obstacle in an area around the mobile base, and wherein causing the adjustable support member to extend out of the mobile base is based, at least in part, on avoidance of the obstacle detected by the proximity sensor.

21. A system comprising:
a mobile base;
a robotic arm coupled to the mobile base, wherein the robotic arm comprises a plurality of arm segments;
at least one inertial measurement unit (IMU) configured to detect a position and a velocity of at least one of the mobile base or the robotic arm;
an adjustable support member coupled to the mobile base, wherein the adjustable support member is configured to be deployed at various angles within a range of rotational angles about a vertical axis, wherein the vertical axis passes through the mobile base; and
a controller comprising a memory and a processor, wherein the memory stores instructions that are executable by the processor to cause the controller to perform operations comprising:
receiving, from the at least one IMU, information indicative of the position and the velocity of at least one of the mobile base or the robotic arm;
based on the information indicative of the position and the velocity of at least one of the mobile base or the robotic arm, determining that a torque induced, at least in part, by the robotic arm is above a predetermined torque threshold, wherein the torque comprises a moment of force about the mobile base, wherein the predetermined torque threshold is based on a balance instability condition of the system; and
causing the adjustable support member to extend out of the mobile base at one of the various angles, within the range of rotational angles, that counteracts the torque.

22. The system of claim 21, wherein the at least one IMU comprises a first IMU coupled to the robotic arm and a second IMU coupled to the mobile base.

* * * * *